Nov. 26, 1929.    M. RABB    1,737,481
COUPLING DEVICE
Filed June 3, 1929
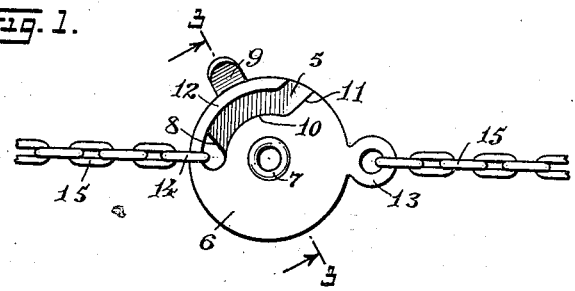
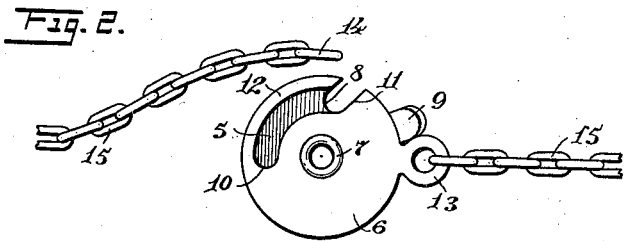
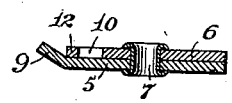
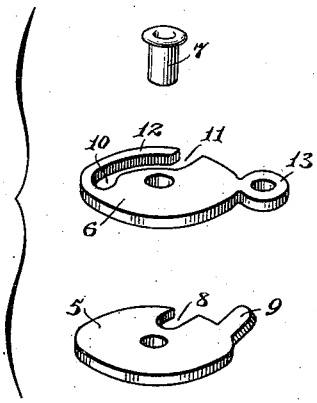
WITNESSES
INVENTOR
Michael Rabb
BY
ATTORNEYS Patented Nov. 26, 1929

1,737,481

UNITED STATES PATENT OFFICE

MICHAEL RABB, OF NEWARK, NEW JERSEY

COUPLING DEVICE

Application filed June 3, 1929. Serial No. 368,076.

This invention relates to coupling devices for articles of jewelry, and has particular reference to an improved device for connecting the ends of necklaces, locket chains or in other capacities where the usual "spring ring" is generally employed.

The "spring ring" is open to many objections, notably, the tendency of the spring to weaken or break due to the small size and fragility, thereby releasing the movable section of the ring. The tubular formation of the ring also makes for a weak structure which is readily distorted and permits of the disconnection of the ends of the article which is coupled thereby when subjected to the slightest stresses or strains.

To overcome the above and other objections and disadvantages, the present invention comprehends a coupling device which while eliminating the use of a spring, serves to effectually connect the articles with which it is associated.

More specifically, the invention contemplates a coupling device of the character set forth, which includes a pair of notched elements connected together for relative movements in opposite directions, the notched portions cooperating to receive and completely embrace an article to be coupled upon movement thereof to one relative position, and serving upon movement to another relative position to release the same. The invention further provides a fastening device embodying a pair of rotatably connected notched discs, one of which being provided with a radially extending part which serves the double function of rotating one disc relative to the other and as a friction latch which serves to hold the discs in closed position.

Other objects reside in the comparative simplicity and strength of construction of the device, the economy with which it may be produced, and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a view of the coupling device in coupled position.

Figure 2 is a similar view of the same in released position.

Figure 3 is a transverse sectional view taken approximately on the line 3—3 of Figure 1.

Figure 4 is a collective perspective view of the parts of the device in separated relation.

Referring to the drawings by characters of reference, 5 and 6 designate respectively a pair of relatively shiftable or movable elements which are illustrated specifically as a pair of discs of approximately the same diameter. A rivet 7 extends concentrically through the discs 5 and 6 and connects the same for relative turning movement. The disc 5 is provided with a peripheral notch 8 and radially projecting teat or lever 9. The teat or lever 9 extends at an angle and overlies the periphery of the disc 6. The other disc 6 is provided with a concentric arcuate slot 10, one end 11 of which extends radially outward through the periphery of the disc and defines a curved or arcuate finger 12 concentric to the path of movement of the notch 8. The closed end of the slot is disposed at a point substantially diametrically opposite an apertured radially projecting lug 13 formed on the disc 6.

When the disk 5 is rotated to the position disclosed in Fig. 1 the teat or lever 9 frictionally engages the arcuate finger 12. Thus the two disks are frictionally held against rotation. Moreover the lever 9 abuts the lug 13 as disclosed in Fig. 2 when the disk 5 is rotated to open position. This insures registration of the slot 11 and the notch 8 when it is desired to engage the link 14 of the chain 15 therewith. From the description it will be manifest that the part 9 serves three functions; first, as a lever for actuating the disk 5; second, as a friction latch for engagement with the arcuate finger 12; and third, as a stop for engagement with the lug 13 in limiting the rotation of the disc 5 in one direction.

In use and operation, with the elements 5 and 6 in the position illustrated in Figure 2;

the end link 14 of the chain or necklace 15 may be inserted in the peripheral notch 8 and the end 11 of the slot 10 which is in registry with the notch. A pull exerted on the free end of the chain 15 will cause the disc 5 to turn with respect to the disc 6 whereby the end link moves into the arcuate slot 10 in embracing relation to the finger 12 until it finally abuts with the closed end of the slot 10, as shown in Figure 1. Sufficient frictional resistance against relative turning of the discs prevents accidental disengagement of the link from its coupled relation with the device. In practice, where the device is employed for connecting the ends of a chain or necklace, one end thereof is permanently attached to the apertured lug 13 as illustrated. When it is desired to disengage the link 14 from the device, the tip of the finger may be engaged with the teat 9 for turning the disc 5 in a direction to dispose the notch 8 in registry with the end 11 of the arcuate slot 10, or if desired, the apertured lug 13 may be grasped and firmly held while a pull is exerted on the link 14 in the proper direction to accomplish this result.

Under the construction and arrangement described, it is apparent that a coupling device has been devised which serves for all the purposes of the usual "spring ring" while eliminating the many weaknesses and disadvantages of the same.

What is claimed is:

1. In a coupling device, a pair of discs connected together for concentric relative rotation, one of the discs having an arcuate concentric slot open at one end and the other having a peripheral notch adapted to register with the open end of the slot when one disc is rotated relative to the other in one direction, and a radially extending finger piece carried by the last mentioned disc for rotating the latter, the radially projecting finger piece being bent at an angle to overlie the first mentioned disc and adapted to frictionally engage the same and thereby hold both discs against relative rotation when the last mentioned disc is rotated to dispose the notch and slot out of registration.

2. In a coupling device, a pair of discs connected together for concentric relative rotation, one of the discs having an arcuate concentric slot open at one end and the other having a peripheral notch adapted to register with the open end of the slot when one disc is rotated relative to the other in one direction, and an angularly disposed finger piece projecting from the edge of the last mentioned disc and overlying the edge of the first mentioned disc and adapted to frictionally engage such edge to hold the disc against relative rotation when the last mentioned disc is rotated to bring the notch and slot out of registration.

3. In a coupling device, a pair of discs connected together for concentric relative rotation, one of the discs having an arcuate concentric slot open at one end and the other having a peripheral notch adapted to register with the open end of the slot when one disc is rotated relative to the other in one direction, and an angularly disposed finger piece projecting from the edge of the last mentioned disc and overlying the edge of the first mentioned disc and adapted to frictionally engage such edge to hold the disc against relative rotation when the last mentioned disc is rotated to bring the notch and slot out of registration, and a lug projecting laterally from the first mentioned disc at a point diametrically opposite the inner end of the slot and constituting an abutment to be engaged by the angularly disposed finger piece to limit the rotation of the last mentioned disc in a direction to bring the notch and slot in registration.

MICHAEL RABB.